United States Patent Office 2,703,321
Patented Mar. 1, 1955

2,703,321

DIBENZANTHRONE DYESTUFFS

David I. Randall and Tellis A. Martin, Easton, Pa., assignors to General Aniline & Film Corporation, New York, N. Y., a corporation of Delaware No Drawing. Application January 6, 1951,
Serial No. 204,814

17 Claims. (Cl. 260—275)

The present invention relates to hydroxy aryl derivatives of chlormethylated vat dyes and to a process for preparing them.

In a number of co-pending patent applications there has been described a large number of chlormethylated derivatives of vat dyes. In general they are prepared by reacting the vat dyes with bis-chloromethyl ether in the presence of concentrated sulphuric acid.

We have now discovered that these chlormethylated vat dyes may be reacted with a hydroxy aryl compound to produce a new series of dyestuffs which are spirit soluble, ketone soluble, and hydrocarbon insoluble.

The new dyes may be formed by the following reaction:

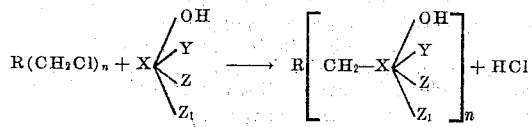

wherein R is a vat dye nucleus, $n$ is a number from 1 to 4, X is an aryl nucleus, Y is selected from the group consisting of hydrogen and hydroxy, Z and $Z_1$ are selected from the group consisting of hydrogen, alkyl and alkoxy and wherein OH is ortho or para to the $CH_2$ bridge.

Examples of hydroxy aryl compounds which may be useful in this reaction include phenol, resorcinol, xylenol, catechol, orcinol, guiacol, alpha, and beta-naphthol, ortho-, meta- and para-cresol, hydroxyanthracene, etc. Examples of chlormethylated vat dyes will be given below but the invention is applicable to all chlormethylated vat dyes.

In general the process comprises heating preferably at 90–250° C. or lower the chlormethylated vat dye with the hydroxy aryl compound.

These new dyes possess widely variant properties which are dependent upon the neucleus and secondly upon the number $n$ in the above formulae. Some are useful directly as a vat dye, e. g., dibenzanthrone and isodibenzanthrone chlormethylated and condensed with phenol. These dyes have excellent light fastness and very good wash fastness despite the free hydroxyl group.

Other important applications are their uses for coloring spirit and ketone solvents but remaining undissolved in hydrocarbon solvents. The compounds having this property in general possess a relatively small molecular weight and higher ($n$) values of 2–4.

The following examples are illustrative of the invention but variations and substitutions may be made within the scope of the invention.

EXAMPLE 1

*Dichloromethylated benzanthronyl pyrazolanthrone with phenol*

Ten parts of dichloromethylated benzanthronyl pyrazolanthrone (see Ex. 1, Serial No. 80,313, filed March 8, 1949, now U. S. Patent No. 2,647,899) were heated at reflux in 80 parts phenol for 2 hours. At the end of this period, the evolution of HCl had ceased. To the cooled solution was added 200 parts ethanol and 100 parts methanol. After stirring for 1 hour the solid precipitate was removed by filtration and washed with methanol. Nine parts of black crystals were obtained. Dyeings were obtained considerably greener in shade than the starting material. They possessed equal light fastness and better wash fastness when compared to dyeings of the starting material.

EXAMPLE 2

*Monochloromethyl benzanthronyl pyrazolanthrone with phenol*

The procedure was the same as in Example 1 except using the monochloromethyl compound. The dye obtained gave dyeings considerably redder than those of Example 1.

EXAMPLE 3

*Dichloromethyl isodibenzanthrone with resorcinol*

To 100 parts of melted resorcinol at 125° C. were added 20 parts of dichloromethylisodibenzanthrone (see Ex. 5, Serial No. 143,596, filed February 10, 1950, now U. S. Patent No. 2,645,646). The temperature was held for one hour at 125° C. At this temperature, 50 parts of ethanol was added slowly, following this 250 parts of water were stirred in. After filtering, drying, and washing, 21.8 parts of dark blue crystals were obtained which on dyeing gave blue shades of excellent light fastness. Methylation of the hydroxyl groups with methyl sulfate in aqueous base resulted in a compound whose dyeings were very good in chlorine and wash fastness.

EXAMPLE 4

*Dichloromethylisodibenzanthrone with phenol*

To 130 parts of molten phenol at 65° C. were added 20.0 parts of dichloromethylisoviolanthrone. On heating to 128° C., HCl fumes escaped. Heating was continued at 160° C. for two hours. The dark blue solution was then cooled to 90° C. and 300 parts of ethanol were added. The precipitate was filtered, washed with methanol and dried, weight 21.5 parts. Vat dyeings of this color were bright violet blue, considerably greener than any of the halogenated isodibenzanthrones. The light and wash fastness were excellent and chlorine fastness good. Methylation gave a dye of good chlorine fastness.

EXAMPLE 5

*Monochloromethyldibenzanthrone with resorcinol*

Twenty parts of monochloromethyldibenzanthrone were treated as in Example 3. A blue black powder amounting to twenty-two parts was obtained whose dyeing properties were similar to the preceding example but of redder hue.

EXAMPLE 6

*Chloromethylbromobenzanthrone with resorcinol*

To a melt of 120 parts of resorcinol at 125° C. was added 25 parts of chloromethylbromobenzanthrone (Example 1, Serial No. 90,774, filed April 30, 1949, now U. S. Patent No. 2,531,465). The temperature was held for one hour at 125–130° C. At 115° C. 300 cc. of water was slowly dropped in and the resulting precipitate filtered. After washing free of resorcinol with water and drying, a yellow compound was obtained which was soluble in dilute aqueous base and ethanol. It is an intermediate which may be further used as a vat dyestuff intermediate for dyes of the Indanthrene Olive Green B type.

EXAMPLE 7

*Chloromethylbromobenzanthrone with phenol*

To 525 parts of molten phenol was added 75 parts of chloromethylbromobenzanthrone. The melt was stirred at 158° C. for two hours and then cooled to 70° C. whereupon it was diluted with a solution consisting of 500 cc. methanol and 200 cc. water. The dark precipitate was filtered, washed with water and dried, weight 68 parts. The compound obtained was yellow in color, possessed solubility like those of the preceding example.

EXAMPLE 8

*Dichloromethylisodibenzanthrone with β-naphthol*

To a melt of 65 parts of β-naphthol was stirred in 10 parts of dichloromethylisodibenzanthrone. The solution was heated for two hours at 160° C. and then at 120° C. was diluted with 300 parts of ethanol. On cooling to 50° C. the precipitate was filtered, washed with methanol, and dried; weight, 13 parts of a violet black powder. It dyed cotton fast blue grey shades.

EXAMPLE 9

*Dichloromethyl bis beta naphththionaphthenindigo with phenol*

To 130 parts of melted phenol 65° C. was stirred in 20.0 parts of dichloromethyl bis beta naphththionaphthenindigo (Ex. 2, Serial No. 135,518, filed December 28, 1949, now U. S. Patent No. 2,545,497). The temperature was increased to 160° C. and held here for two hours. The reaction product was worked up as in Example 1. On dyeing cotton light fast brown shades were obtained.

EXAMPLE 10

*Dichloromethyl bis beta naphththionapthenindigo with resorcinol*

This reaction was run exactly as in Example 3. The dye obtained showed greater solubility in alcohol but its dyeings were not as fast when compared to the product of the preceding example.

EXAMPLE 11

*Dichloromethyl-2,2'-dibenzanthronyl with p-octyl phenol*

One hundred parts of p-octyl phenol and 16.5 parts of dichloromethyl-2,2'-dibenzanthronyl (Ex. 2, Serial No. 143,596, filed February 10, 1950) were heated together at 180° C. for 3 hours. The melt was then cooled to 70° C. and then added to 1500 parts methanol containing 40 parts of water. The precipitate obtained was filtered, and dried; weight 17.7 parts of a greenish yellow compound soluble in potassium hydroxide ethanol solutions.

EXAMPLE 12

*Chloromethyl indigo with phenol*

To 100 parts of phenol at 100° C. was stirred in 10 parts of chloromethyl indigo. On heating at 140° C. for two hours and working up as in Example 1, a blue powder was obtained which gave on cotton bluish green dyeings much greener than indigo itself. The dye had the valuable property of dissolving readily in acetone and alcohols and at the same time being insoluble in hydrocarbons.

The resorcinol derivative obtained in a similar manner was appreciably greener than the phenol derivative and very much more soluble in alcohol and acetone.

EXAMPLE 13

*Pyranthrone $(CH_2Cl)_{2.2}$ with resorcinol*

While a molten mass of 100 parts of resorcinol was stirred at 110–120° C. 10 parts of pyranthrone $(CH_2Cl)_{2.2}$ were added. The reaction mixture was heated at 135–140° C. for three hours at the end of which time the evolution of hydrogen chloride had ceased. The resulting mixture was worked up by pouring, while still hot, into 1000 parts of warm water, collecting the precipitated material on a filter, washing repeatedly with hot water, stirring the wet filter cake with 1000 parts of 2% sodium hydroxide, filtering, acidifying the filtrate with dilute hydrochloric acid, refiltering, washing the filter cake until acid free, drying and sieving (100 mesh); 7 g. of brownish-orange product. It is a spirit-, ketone-, alkali-soluble, and hydrocarbon-insoluble dye. When evaluated as a spirit-soluble dye, this product gave bright orange shades of excellent fastness to light.

EXAMPLE 14

*Pyranthrone $(CH_2Cl)_{2.9}$ with resorcinol*

Twenty parts of pyranthrone $(CH_2Cl)_{2.9}$ [Indanthrene Golden Orange GA $(CH_2Cl)_{2.9}$] were added portionwise with mechanical stirring to 200 parts of resorcinol at 130–140° C. After heating at 140–150° C. for four hours, the resulting product was isolated by pouring the hot reaction mixture into 6000 parts of warm water, filtering, washing repeatedly with warm water until the excess recorcinol is removed, drying in an oven at 80–90° C. and sieving; 25.5 g. Its properties are similar to the product prepared in Example 13; however, it is somewhat more soluble in alcohol and dilute alkali.

Methylation of the phenolic hydroxy groups gives a vat dye which has excellent affinity for cotton; its dyeing being bright orange shades of excellent fastness to chlorine, light and wash.

A mixture of 3 parts of this spirit-soluble dye and two parts of tetra (resorcinylmethyl) copper phthalocyanine yields an olive green, spirit-soluble dye of good fastness properties.

EXAMPLE 15

*Dichloromethyl Indanthrene Red RK with resorcinol*

To 200 parts of resorcinol at 110–120° C. were added with mechanical stirring 20 parts of Indanthrene Red RK $(CH_2Cl)_2$. The reaction mixture was heated at 140–150° C. for two hours and then worked up according to the directions given in Example 14. Yield: 26 g. of brown solid. As a spirit soluble dye, it yielded yellowish-brown shades of good fastness properties.

The tetramethoxy derivative, prepared by the action of dimethyl sulfate, is a vat yellow dye of good affinity for cotton.

A mixture of 3 parts of this resorcinol derivative and two parts of copper tetra (resorcinylmethyl) phthalocyanine is a green, spirit-soluble dye.

EXAMPLE 16

*Dichloromethyl Indanthrene Red RK with p-(diisobutyl)-phenol*

Ten parts of Indanthrene Red RK $(CH_2Cl)_2$ were added with efficient stirring to 115 parts of p-diisobutylphenol at 110–120° C. Heating at 170–180° C. for three hours, pouring into 200 ml. of warm 80% methanol, filtering, washing with 80% methanol gave 6 g. of brown material. It is soluble in benzene, insoluble in dilute alkali. From a vat of this product, cotton is dyed in brown shades of excellent fastness to light and wash.

EXAMPLE 17

*3,3'-dibenzanthronyl $(CH_2Cl)_2$ with resorcinol*

Twenty parts of 3,3'-dibenzanthronyl $(CH_2Cl)_2$ were added portionwise with stirring to 200 parts of resorcinol at 110–120° C. Heating at 140–160° C. for two hours, pouring into 2000 parts of warm $H_2O$, filtering, washing with hot water, stirring the wet filter cake with 1000 parts of warm 2% sodium hydroxide, filtering through filter cel, acidifying the filtrate with dilute hydrochloric acid, filtering, washing well with water, drying and sieving (100 mesh) yielded 24 parts of light yellow product. This compound dissolves readily in spirit solvents and dilute alkali, insoluble in hydrocarbon solvents.

EXAMPLE 18

*3,3'-dibenzanthronyl $(CH_2Cl)_{1.6}$ with resorcinol*

A reaction mixture consisting of 10.7 parts of 3,3'-dibenzanthronyl $(CH_2Cl)_{1.6}$ and 100 parts of resorcinol, was treated as in Example 17; 10.7 parts of the spirit yellow product were obtained.

A mixture of 3 parts of this product and two parts of tetra (resorcinyl-methyl) copper phthalocyanine gives a bright green spirit- and alkali-soluble dye of improved fastness properties.

Methylation by heating with dimethyl sulfate and dilute alkali gives the tetramethoxy derivative. When the material is vatted with sodium hydrosulfite at 80–110° C. cotton is dyed in green shades.

EXAMPLE 19

*3,3'-dibenzanthronyl $(CH_2Cl)_2$ with phenol*

Ten parts of the dichloromethyl derivative (as used in Example 17) were added to 100 parts of phenol at 110–120° C. Heating at 140–150° C. for five hours, subjecting the resulting reaction mixture to a steam distillation to remove excess phenol, filtering and drying yielded the light yellow product. Except for being somewhat less soluble in alcohol and dilute alkali, its properties are very similar to the resorcinol derivative, Example 18.

EXAMPLE 20

*3,3'-dibenzanthronyl $(CH_2Cl)_{1.6}$ with a mixture of m,p-cresol*

Ten parts of 3,3'-dibenzanthronyl $(CH_2Cl)_{1.6}$ were added to 100 parts of a mixture of m-, and p-cresol at 120–150° C. Heating at 160–180° C. for twenty hours and working up the resulting reaction mixture according to the directions given in Example 19 yielded a spirit- and alkali-soluble dye.

EXAMPLE 21

*Dichloromethyl (CH2Cl2 [1-(biphenyl-p-carboylamino)anthraquinone] with resorcinol*

Twenty-five parts of (CH2Cl)2 [1-(biphenyl-p-carboylamino) anthraquinone] was added slowly with effective mechanical stirring to 200 parts of resorcinol at 120–130° C. The reaction mixture was heated at 130–140° C. for three hours, poured while still hot into 2000 parts of warm water, subjected to a steam distillation, filtered, washed with hot water, dried and sieved (100 mesh); 35.8 parts of yellowish-brown solid. It is a yellow spirit- and alkali-soluble dye.

We claim:
1. A compound having the general formula:

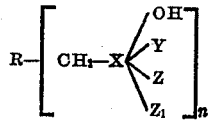

wherein R is the radical of a vat dyestuff linked directly through its nucleus to the portion in brackets, $n$ is a number from 1 to 4, X is an aryl nucleus, Y is selected from the group consisting of hydrogen and hydroxy, Z and $Z_1$ are selected from the group consisting of hydrogen, alkyl and alkoxy and wherein OH is ortho or para to the CH2 bridge.

2. A process for preparing the compound of claim 1 which comprises heating a chlormethylated vat dye with a hydroxy aryl compound.

3. The compound of claim 1 in which the portion in brackets is a methylene phenol.

4. The compound of claim 1 in which the portion in brackets is a methylene resorcinol.

5. The compound of claim 1 in which the portion in brackets is a methylene cresol.

6. The compound of claim 1 in which the portion in brackets is a methylene naphthol.

7. The compound of claim 1 in which the portion in brackets is a methylene xylenol.

8. The compound of claim 1 in which R is the radical of benzanthrone pyrazoleanthrone.

9. The compound of claim 8 in which the portion in brackets is methylene phenol.

10. The compound of claim 1 in which R is the radical of isoviolanthrone.

11. The compound of claim 10 in which the portion in brackets is methylene resorcinol.

12. The compound of claim 1 in which R is the radical of bromobenzanthrone.

13. The compound of claim 12 in which the portion in brackets is methylene resorcinol.

14. The compound of claim 1 in which R is the radical of indigo.

15. The compound of claim 14 in which the portion in brackets is methylene phenol.

16. The compound of claim 1 in which R is the radical of pyrazoleanthrone.

17. The compound of claim 16 in which the portion in brackets is methylene resorcinol.

References Cited in the file of this patent

UNITED STATES PATENTS

| 1,755,879 | Klaischer et al. | Apr. 22, 1930 |
| 1,867,459 | Kranzlein et al. | July 12, 1932 |
| 2,005,529 | Bishop et al. | June 18, 1935 |
| 2,330,722 | Lieber | Sept. 28, 1943 |

FOREIGN PATENTS

| 683,316 | Germany | Oct. 1939 |

OTHER REFERENCES

Color Index, 1924 Supplement 1928, p. 298, #1246.